US008666874B2

(12) United States Patent
Breitenbach et al.

(10) Patent No.: US 8,666,874 B2
(45) Date of Patent: Mar. 4, 2014

(54) PRODUCTS AND PROCESSES FOR ESTABLISHING MULTI-TRANSACTION RELATIONSHIPS WITH CUSTOMERS OF VENDING MACHINES

(75) Inventors: Paul T. Breitenbach, Wilton, CT (US); Sih Y. Lee, Northvale, NJ (US); Paul D. Signorelli, Ridgefield, CT (US); Stephen C. Tulley, Monroe, CT (US); Daniel E. Tedesco, Shelton, CT (US); James A. Jorasch, New York, NY (US); Geoffrey M. Gelman, Brooklyn, NY (US); Robert C. Tedesco, Trumbull, CT (US)

(73) Assignee: Inventor Holdings, LLC, Stamford, CT (US)

( * ) Notice: Subject to any disclaimer, the term of this patent is extended or adjusted under 35 U.S.C. 154(b) by 0 days.

(21) Appl. No.: 13/561,863

(22) Filed: Jul. 30, 2012

(65) Prior Publication Data
US 2012/0310409 A1 Dec. 6, 2012

Related U.S. Application Data

(63) Continuation of application No. 12/775,705, filed on May 7, 2010, now Pat. No. 8,234,207, which is a continuation of application No. 10/581,588, filed as application No. PCT/US2004/041561 on Dec. 9, 2004, now Pat. No. 7,739,181.

(60) Provisional application No. 60/527,988, filed on Dec. 9, 2003.

(51) Int. Cl.
*G06Q 40/00* (2012.01)

(52) U.S. Cl.
USPC .............................. 705/37; 705/38

(58) Field of Classification Search
USPC ...................................... 705/35–40
See application file for complete search history.

(56) References Cited

U.S. PATENT DOCUMENTS

| 4,654,800 | A | * | 3/1987 | Hayashi et al. | ............... 700/236 |
| 5,269,521 | A | | 12/1993 | Rossides | |
| 5,772,510 | A | | 6/1998 | Roberts | |
| 5,780,133 | A | * | 7/1998 | Engstrom | .................. 428/40.1 |
| 5,997,236 | A | | 12/1999 | Picioccio | |
| 6,044,952 | A | | 4/2000 | Haggerty et al. | |
| 6,085,888 | A | | 7/2000 | Tedesco et al. | |

(Continued)

FOREIGN PATENT DOCUMENTS

WO    WO 97/28510    8/1997

OTHER PUBLICATIONS

Stanton, John L. et al., "21 food trends for the $21^{st}$ century. Super Marketing", Grocery Marketing, Sep. 1996, 4 pp.

(Continued)

*Primary Examiner* — Thu Thao Havan
(74) *Attorney, Agent, or Firm* — Fincham Downs, LLC; Carson C. K. Fincham

(57) ABSTRACT

Disclosed herein are various systems and methods for improving the establishment and management of vending machine subscriptions, including systems and methods for constructing, communicating, and registering subscriptions, as well as various methods for processing the redemption of vending machine subscription items. Several additional embodiments are disclosed, including various alternate methods of promoting longitudinal machine-customer relationships.

12 Claims, 6 Drawing Sheets

(56) References Cited

U.S. PATENT DOCUMENTS

| | | | |
|---|---|---|---|
| 6,298,972 | B1 | 10/2001 | Tedesco et al. |
| 6,438,451 | B1 | 8/2002 | Lion |
| 6,584,309 | B1 | 6/2003 | Whigham |
| 6,854,642 | B2 | 2/2005 | Metcalf |
| 6,898,299 | B1 | 5/2005 | Brooks |
| 6,898,421 | B2 | 5/2005 | Mori et al. |
| 6,990,472 | B2 | 1/2006 | Rosenthal et al. |
| 7,036,724 | B2 | 5/2006 | Lealao et al. |
| 7,318,049 | B2 | 1/2008 | Iannacci |
| 7,409,554 | B2 | 8/2008 | Ishibashi et al. |
| 7,519,992 | B2 | 4/2009 | Miyazaki et al. |
| 7,657,887 | B2 | 2/2010 | Kothandaraman et al. |
| 7,739,181 | B2 * | 6/2010 | Breitenbach et al. ........... 705/37 |
| 7,937,290 | B2 | 5/2011 | Bahir |
| 7,991,507 | B2 | 8/2011 | Liff et al. |
| 2002/0046186 | A1 | 4/2002 | Nishio et al. |
| 2002/0120499 | A1 | 8/2002 | Liu et al. |
| 2002/0161476 | A1 | 10/2002 | Panofsky et al. |
| 2002/0165787 | A1 | 11/2002 | Bates et al. |
| 2002/0165788 | A1 | 11/2002 | Bates et al. |
| 2003/0055735 | A1 | 3/2003 | Cameron et al. |
| 2004/0068346 | A1 | 4/2004 | Boucher |
| 2004/0153421 | A1 | 8/2004 | Robinson |
| 2005/0240958 | A1 | 10/2005 | Nguyen et al. |

OTHER PUBLICATIONS

Young, Steve et al., "Cashless Vending Machines", CNNfn Digital Jam, Copyright 1999, (http global factivia com/en/arch/display asp), 3 pp.

"Computers/Data Collection; National NAMA Expo Equipment Report.", Automatic Merchandiser, Feb. 1, 2002, 4 pp.

Kasavana, Michael, "Labor scheduling software extends to other management functions; NAMA Insight.", Auto Merchandiser, May 1, 2003, 3 pp.

"Cruise Critic's Top Tips for Finding the Best Cruise Values and Saving Money Onboard", PR Newswire, Aug. 26, 2003, 2 pp.

Berk, Christina Cheddar, "A Reliable Vending Machine? Right", The Wall Street Journal, Nov. 12, 2003 1 pg.

Website: "Eliminate Manual Sales, Costly Inventories, Increase Security and Automate Card Sales!", (http //www vendapin com/ pinprinter html), download date: Nov. 13, 2003, 3 pp.

Website: "The swipe & sip soda: pepsi taste-tests new wireless credit card system for vending machines", mpulse, (http //cooltown hp com/mpulse/0602-pepsi asp?print=yes), download date: Nov. 13, 2003, 2 pp.

International Search Report for PCT/US04/41561 mailed Jun. 17, 2005, 3 pp.

Cioletti, Jeff "Cash Out?", Beverage World, Feb. 15, 2003, 2 pp.

Office Action for U.S. Appl. No. 11/398,378 mailed Apr. 14, 2008, 13 pp.

Notice of Allowance for U.S. Appl. No. 11/398,378 mailed Jul. 24, 2009, 11 pp.

Office Action for U.S. Appl. No. 11/398,378 mailed Sep. 15, 2008, 18 pp.

International Search Report for PCT/US07/65859 Oct. 18, 2007, 4 pp.

Written Opinion for PCT/US07/65859 Oct. 18, 2007, 4 pp.

Office Action for U.S. Appl. No. 12/589,788 mailed Apr. 11, 2011, 15 pp.

Office Action for U.S. Appl. No. 12/589,788 mailed Oct. 5, 2010, 13 pp.

Written Opinion for PCT/US04/41561, mailed Jun. 17, 2005, 3 pp.

Notice of Allowance for U.S. Appl. No. 10/581,588 mailed Feb. 5, 2010, 6 pp.

Office Action for U.S. Appl. No. 10/581,588 mailed Jul. 9, 2009, 9 pp.

Examiner's Answer for U.S. Appl. No. 12/589,788 mailed May 9, 2012, 14 pp.

Notice of Allowance for U.S. Appl. No. 12/775,705 mailed Mar. 19, 2012, 7 pp.

Notice of Allowance for U.S. Appl. No. 12/775,705 mailed Mar. 19, 2012, 9 pp.

Office Action for U.S. Appl. No. 12/775,705 mailed Mar. 19, 2012, 9 pp.

* cited by examiner

PRODUCTS AND PROCESSES FOR ESTABLISHING MULTI-TRANSACTION RELATIONSHIPS WITH CUSTOMERS OF VENDING MACHINES

CROSS REFERENCE TO RELATED APPLICATIONS

The present application claims benefit and priority to, and is a continuation of, U.S. patent application Ser. No. 12/775,705 filed May 7, 2010 and titled "PRODUCTS AND PROCESSES FOR ESTABLISHING MULTI-TRANSACTION RELATIONSHIPS WITH CUSTOMERS OF VENDING MACHINES", which issued as U.S. Pat. No. 8,234,207 on Jul. 31, 2012, and which itself is a continuation of U.S. patent application Ser. No. 10/581,588 filed Jan. 4, 2008 and issued as U.S. Pat. No. 7,739,181 on Jun. 15, 2010, which application claims priority from International Application No. PCT/US2004/041561 filed Dec. 9, 2004 which published as WO 2005/057379 on Jun. 23, 2005 and also claims priority from U.S. Provisional Patent Application No. 60/527,988, filed Dec. 9, 2003. The entirety of each above-noted application of which is hereby incorporated herein by reference.

BACKGROUND

Applicants have previously invented various systems and methods for establishing and managing subscriptions to items sold at vending machines. Various systems and methods enabling "subscription vending" are disclosed in Applicant's U.S. Pat. No. 6,298,972, entitled METHOD AND APPARATUS FOR ESTABLISHING AND MANAGING VENDING MACHINE SUBSCRIPTIONS, issued Oct. 9, 2001; U.S. Pat. No. 6,085,888, entitled METHOD AND APPARATUS FOR ESTABLISHING AND MANAGING VENDING MACHINE SUBSCRIPTIONS, issued Jul. 11, 2000; and U.S. Pat. No. 5,988,346, entitled METHOD AND APPARATUS FOR ESTABLISHING AND MANAGING VENDING MACHINE SUBSCRIPTIONS, issued Nov. 23, 1999. The entirety of each of these patents is incorporated by reference herein for all purposes.

In some embodiments of Applicant's prior inventions, a vending machine control system may identify and output an offer for a subscription to one or more products offered at a vending machine. Such subscriptions would enable customers to purchase at least two units of a product, and redeem the products at different points in time (e.g. one unit the first day, another unit the following day). Such subscription offers typically would provide customers with the ability to purchase the products at a discount relative to the total of the retail prices of all the units. For example, a customer may be offered the opportunity to purchase a "subscription" to six cans of soda, redeemable one per day, for the price of five cans. Subscription offers are a useful promotion as they enable the vending machine to increase revenue in a predictable way. Further, any per unit discount provided by the subscription promotion may be economically justified by the guaranteed increase in sales volume that results when the customer accepts the subscription offer, and pays for the subscription.

DETAILED DESCRIPTION

Figure 1:
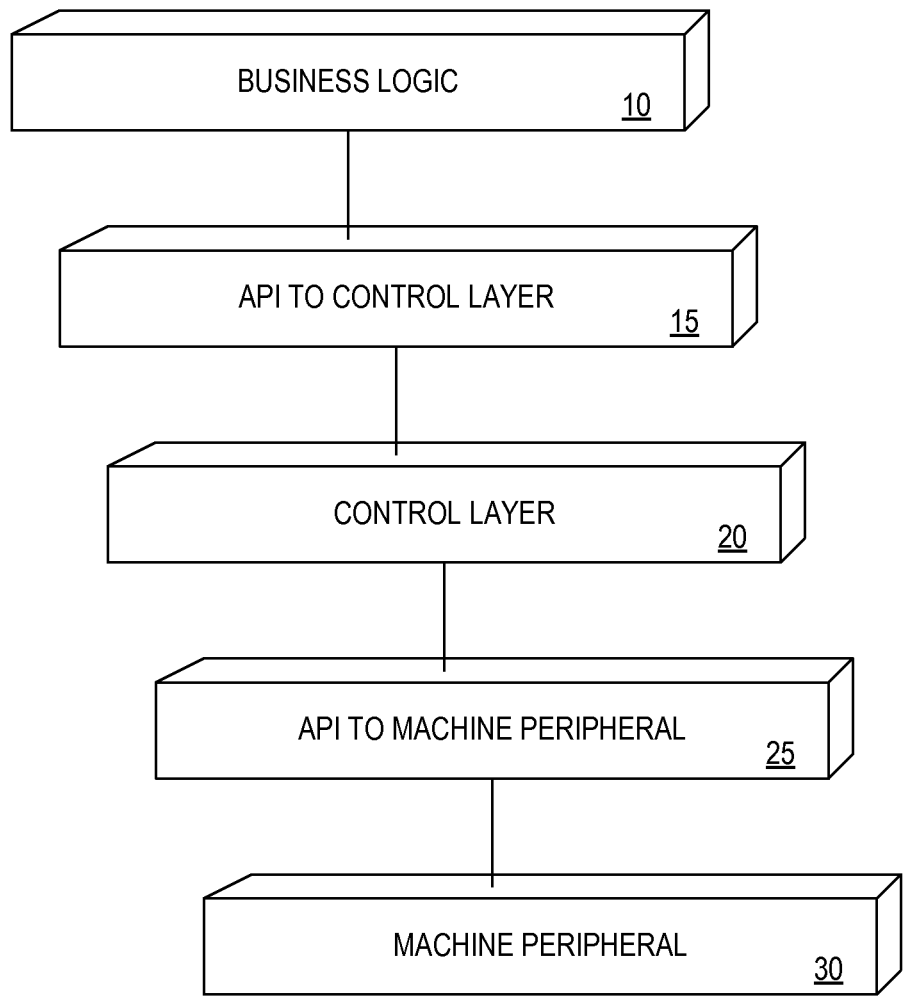
FIG. 1 is a block diagram of an embodiment in which software is categorized according to different components.

In the following description, reference is made to the accompanying drawings that form a part hereof, and in which is shown, by way of illustration, specific embodiments in which the invention may be practiced. These embodiments are described in sufficient detail to enable those skilled in the art to practice the invention, and it is to be understood that other embodiments may be utilized and that structural, logical, software, and electrical changes may be made without departing from the scope of the present invention. The following description is, therefore, not to be taken in a limiting sense.

Headings provided herein are for convenience and are not to be taken as limiting the disclosure in any way.

Numerous embodiments are described in this patent application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with various modifications and alterations. Although particular features of the present invention may be described with reference to one or more particular embodiments or figures, it should be understood that such features are not limited to usage in the one or more particular embodiments or figures with reference to which they are described.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

The following terms are defined as indicated below, unless explicitly described otherwise.

Actual Item Velocity—The actual rate at which a given product is sold by a vending machine during a sales period.

Fill Period, Sales Period—The period of time between restock dates.

Full Price, Retail Price—The normal price charged for the purchase of a given product. Typically, subscription offers present customers with the opportunity to purchase items at less than full price.

Ideal Product Velocity, Target Product Velocity, Target Velocity—The desired rate at which a given product should be sold by a vending machine during a sales period. Thus, in some embodiments, an ideal velocity may be set or calculated for each product indicating the rate at which products must be sold in order to deplete the inventory to a certain level by the end of a given sales period (i.e. by the restock time). For example, an ideal product velocity may be calculated by a vending machine control system after an operator inputs a restock date and a desired remaining inventory for the date (e.g. an operator may wish to have only 1 of each item remaining at the restock date so that the machine sells as many items as possible without completely selling out and thereby disappointing customers). Thus, if an operator (a) stocks 50 units of Soda A, (b) inputs a restock date fourteen days away, and (c) indicates that only one unit of Soda A should remain at the restock date, the control system may divide 49 by 14 to conclude that, on average, 3.5 units must be sold per day within the sales period in order to realize the ideal product velocity. As discussed herein, a vending machine control system may periodically, substantially continuously, or otherwise determine whether or not actual item velocity is at least equal to the ideal item velocity, and if not, may institute subscription promotions as discussed herein.

Operator, Owner, Route Driver—The owner (or agent thereof) of a vending machine.

Redemption, Redemption Transaction—The process by which a customer who has previously accepted a subscription offer, and thereby engaged in a registration transaction, enters a subscription code into an input device that is in communication with a vending machine control system, and receives one or more units of the product indicated by the underlying subscription. In some embodiments, codes may be entered directly by customers (e.g. into a keypad). In other embodiments, codes may be entered via token (e.g. a bar-coded voucher is deposited into a barcode reading bill validator).

Registration, Registration Transaction—The process by which a customer accepts a subscription offer by (1) signaling acceptance of a subscription offer (e.g. pressing a button on a vending machine's keypad), and/or (2) providing payment to a vending machine operator. In some embodiments, registration may take place at a vending machine. In such embodiments, a registration transaction may optionally include the dispensing of a first product or products in a subscription. In other embodiments, registration may take place through a communications network, such as a telephone or computer network.

Registered Subscription—A contractual relationship between a customer and a vending machine operator that is (1) formed upon the customer's acceptance of a subscription offer and (2) recorded and tracked in a database.

Renewal—The process by which a previously registered subscription is identified and updated to reflect a customer's entitlement to additional units of product. In some embodiments, subscriptions are renewed as part of a redemption transaction. In other embodiments, subscriptions may be renewed through a communications network, such as a telephone or computer network. Renewal may be performed upon request, or authorized to occur automatically under certain conditions.

Restock Date, Restock Time—The time and/or date that a vending machine is scheduled to be restocked by an operator (or agent thereof) of a vending machine.

Subscription Code, Code, Subscription Identifier—A data element that is correlated in a database with a registered subscription. Typically, such data elements are "unique" or substantially unique identifiers. Such data elements may include, but are not limited to, customer-selected codes such as a PIN code, codes generated automatically (e.g., random digits) for the customer, customer Social Security Numbers (SSNs), customer credit or debit card numbers, currency serial numbers (e.g. the serial number of a dollar bill), customer birthdays, and biometric data (e.g. a customer's retinal patterns, fingerprint patterns, topical facial patterns, signatures, or the like). In some embodiments, subscription codes may be stored on, printed on or otherwise indicated by tokens, coupons, cards, wirelessly transmitting devices, RFID transmitters, and other physical media, as described herein.

Subscription Offer, Offer—An offer that is provided to a customer proposing that the customer pay a subscription price in exchange for the ability to redeem at least two units of a product or products at a vending machine in at least two redemption transactions. Thus, by accepting subscription offers, customers are able to purchase at least two units of a product, and redeem the products at different points in time (e.g. one the first day, another the following day).

Subscription Price—The price charged in conjunction with the registration of a subscription offer. In some embodiments, the subscription price may be equal to the sum of the full prices of the products indicated by the subscription offer. In other embodiments, the subscription price may be less than the sum of the full prices of the products indicated by the subscription offer. In such embodiments, subscription offers would provide customers with the ability to purchase the products at a discount relative to the total of the retail prices of all the purchased units. In yet other embodiments, such as the "hard reserve" embodiments described herein, the subscription price may be more than the sum of the full prices of the products indicated by the subscription offer. A subscription price need not be fixed. For example, the amount a customer pays may not be in return for a fixed number of items. Also, the amount paid need not be known a priori. For example, the amount may be periodically charged in portions (e.g., once per week), and the amounts so charged need not be equal.

Token, Voucher, Card, Certificate—A physical medium for storing subscription codes and identifying registered subscriptions. In various embodiments, tokens may comprise one or more of: credit cards, debit cards, stored value cards, smart cards, or other paper-based or plastic cards, certificates, vouchers, coin/disk shaped media, wireless transmitters, RFID tags. In some embodiments, tokens are "machine readable." Examples of machine-readable tokens include cards with markings thereon, such as punch holes or bar codes, for optical recognition by a vending machine. Also, machine readable tokens include read/write and read-only magnetic stripe cards. In some embodiments, a single token may identify a single registered subscription (e.g. a code refers to a specific registered subscription in a relational database). In other embodiments, several tokens may identify a single registered subscription (e.g., a booklet of vouchers or several vouchers attached by perforation). During redemption transactions, tokens are presented by customers to a vending machine, which validates tokens (as described herein), and, if appropriate, dispenses one or more units of one or more products.

1. Overview of Example Embodiments

According to some embodiments of the present invention, a customer approaches a vending machine that displays a message (e.g., on a touch screen) instructing the customer to insert money or a subscription code. The customer inserts money in excess of a threshold (e.g., the customer tenders $5 or more), and the vending machine responds by asking the customer whether he would like to purchase a subscription to any twelve items for $5. The customer indicates that he would like to purchase a subscription (e.g., by pressing a button marked "Purchase Subscription").

The vending machine then asks the customer (e.g., via a textual and/or graphic display) whether he would like to choose his own subscription code, or would like to be provided with one selected for him. The customer indicates that he would like to enter a subscription code of his choosing. He then enters a code via a keypad, and is asked to verify the code. He enters the same code again via the keypad, and in response the vending machine provides him with a printed voucher bearing the subscription code.

In a transaction involving redemption, the customer subsequently approaches that vending machine that displays a message instructing the customer to insert money or a subscription code. The customer enters the code printed on the voucher. The vending machine verifies that the subscription code is valid and determines the terms of the subscription, including how many products may still be redeemed pursuant to the subscription.

The customer then indicates which item he desires (e.g., by entering an indication via a keypad of the product row containing the desired item). The vending machine asks if any other items are desired (not yet having reached a maximum number of items which may be dispensed per transaction, per day, etc.), and the customer in turn indicates three more desired items in the same manner. The vending machine then ceases requesting if any other items are desired, and dispenses the four indicated items.

2. Vending Machines

Generally, a vending machine may comprise a device, or communicate with a device (e.g., a server, a peripheral device, and/or a peripheral device server), configured to manage sales transactions with customers by, among other things, receiving payment from customers, controlling the pricing and/or distribution (dispensing) of goods and/or controlling entitlements to services.

As used herein, a product is a good or service sold by a vending machine. Examples of goods sold at vending machines include beverages (e.g. cans of soda; bottles of water or iced tea) and snacks (e.g. candy bars; bags of chips). Examples of services sold by vending machines include car washes, photography services and access to digital content (e.g. permitting the downloading of MP3 files or cellular telephone "ring tones" to a handheld device such as an iPod™ device or cellular telephone; permitting the viewing/listening of video, audio, movie trailers, music videos, and the like).

As is well known, an operator is used to denote an owner (or agent thereof) of a vending machine. In one or more embodiments, an operator is a "route driver" or other service person that services one or more vending machines by restocking vending machines, and/or removing or depositing currency in vending machines.

A vending machine may include a processor, such as one or more Intel® Pentium® or Centrino™ processors. The processor may include, or be coupled to, (i) one or more clocks or timers, and (ii) one or more communication ports through which the processor may communicate, in accordance with some embodiments, with other devices such as one or more peripherals, controllers and POS terminals. In one or more embodiments, a communication port may comprise a modem (e.g. a cellular modem or otherwise), a wireless transmitter and/or a transponder (e.g. an infrared transmitter/receiver, a radio transmitter/receiver).

The processor may also be in communication with a data storage device. The data storage device may include any appropriate combination of magnetic, optical and/or semiconductor memory, and may include, for example, additional processors, communication ports, Random Access Memory ("RAM"), Read-Only Memory ("ROM"), a compact disc and/or a hard disk. The processor and the storage device may each be, for example: (i) located entirely within a single computer or other computing device; or (ii) connected to each other by a remote communication medium, such as a serial port cable, a LAN, a telephone line, radio frequency transceiver, a fiber optic connection or the like. In some embodiments for example, the vending machine may comprise one or more computers (or processors) that are connected to a remote server computer operative to maintain databases, where the data storage device is comprised of the combination of the remote server computer and the associated databases.

The data storage device stores a program for controlling the processor. The processor performs instructions of the program, and thereby can operate in accordance with one or more embodiments of the present invention, and particularly in accordance with the methods described in detail herein. An appropriate computer program can be developed using an object oriented language that allows the modeling of complex systems with modular objects to create abstractions that are representative of real world, physical objects and their interrelationships. However, it would be understood by one of ordinary skill in the art that the embodiments of the invention as described herein can be implemented in many different ways using a wide range of programming techniques as well as general purpose hardware systems or dedicated controllers.

The program may be stored in a compressed, uncompiled and/or encrypted format. The program furthermore may include program elements that may be generally useful, such as an operating system, a database management system and device drivers for allowing the processor to interface with computer peripheral devices. Appropriate general purpose program elements are known to those skilled in the art, and need not be described in detail herein.

Further, the program is operative to execute a number of invention-specific, objects, modules and/or subroutines, as disclosed herein.

According to some embodiments of the present invention, the instructions of the program may be read into a main memory of the processor from another computer-readable medium, such from a ROM to a RAM. Execution of sequences of the instructions in the program can cause the processor to perform the process steps of one or more embodiments of the invention. In alternative embodiments, hard-wired circuitry or integrated circuits may be used in place of, or in combination with, software instructions for implementation of the process steps of one or more embodiments of the invention. Thus, embodiments of the present invention are not limited to any specific combination of hardware, firmware, and/or software.

A vending machine may comprise payment processing mechanism(s), which may comprise one or more mechanisms for receiving payment and dispensing change (e.g., a coin acceptor, a bill validator, a card reader, a magnetic stripe reader, a change dispenser).

In a manner known in the art, a magnetic stripe card reader may read data on the magnetic stripe of a credit or debit card, and it may cooperate with conventional point-of-sale credit card processing equipment to validate card-based purchases through a conventional transaction authorization network. Suitable card-based transaction processing systems and methods are available from USA Technologies, Inc., of Malvern, Pa.

The coin acceptor, bill validator and change dispenser may communicate with a currency storage apparatus (a "hopper") and may comprise conventional devices such as models AE-2400, MC5000, TRC200 by Mars, Inc. of West Chester, Pa., or CoinCo model 9300-L.

The coin acceptor and bill validator may receive and validate currency that is stored by the currency storage apparatus. Further, a bill validator or coin acceptor may be capable of monitoring stored currency and maintaining a running total of the stored currency, as is discussed with reference to U.S. Pat. No. 4,587,984, entitled COIN TUBE MONITOR MEANS, the entirety of which is incorporated by reference herein for all purposes. The change dispenser activates the return of coinage to the customer where appropriate. Such apparatus may feature Multidrop Bus (MDB) and/or Micromech peripheral capabilities, as is known in the art.

In another embodiment, a vending machine in accordance with the present invention may be configured to receive payment authorization and product selection commands through a wireless device communication network, directly or indirectly, from a customer device (e.g. a cellular telephone). In such an embodiment, a payment processing mechanism may comprise a cellular transceiver operatively connected to a processor, as described herein. Systems and methods allowing for the selection of and payment for vending machine products through cellular telephones are provided by USA Technologies, Inc. Further, in such an embodiment, a customer cellular telephone may serve as an input/output device, as described herein.

Further details concerning vending machine payment processing mechanisms are well known in the art.

A vending machine may further comprise one or more output devices and one or more input devices. Any number of output devices and/or input devices may be included in the vending machine.

In accordance with embodiments of the presenting invention, a vending machine may include an input device for receiving input from a customer, operator, or other person. Also, a vending machine may include one or more output devices for outputting product and/or other information to a customer or operator.

Many combinations of input and output devices may be employed in accordance with embodiments of the present invention. For example, in embodiments which feature touch screens (described herein), input and output functionality may be provided by a single device.

As described, a vending machine may include more than one input device. For example, a vending machine may include an exterior input device for receiving customer input and an interior input device for receiving operator input. In some embodiments, however, the input device provides the dual functionality of receiving input data from both operators and customers.

As also described, a vending machine may comprise more than one output device. For example, a vending machine may include both an Liquid Crystal Display (LCD) screen and several Light Emitting Diodes (LEDs).

An output device may comprise, for example, an LCD and/or one or more LEDs displays (e.g., several alphanumeric LEDs on the shelves of a vending machine, each LED being associated with a row of product inventory).

In one embodiment, an LED display screen may be mounted to a vending machine (e.g., attached thereto, such as via bolts or other mounting hardware). Such a mounted LED display screen and may be used to communicate messages (described herein) to customers. A suitable LED display screen for such an embodiment may be housed in an aluminum case having a length of 27.5", a height of 4.25", and a depth of 1.75". Such a display screen may have a display area capable of showing 13 alphanumeric and/or graphical characters. Further, such an LED display screen may comprise a serial computer interface, such as an RJ45/RS232 connector, for communicating with a processor, as described herein. Further still, such an LED display may be capable of outputting text and graphics in several colors (e.g., red, yellow, green).

Further, in some embodiments, an output device comprises a printer. In one embodiment, a printer is configured to print on card stock paper (e.g. 0.06 mm to 0.15 mm thickness), such as the EPSON EU-T400 Series Kiosk Printer. Further, a printer may be capable of thermal line printing of various alphanumeric and graphical symbols in various font sizes (e.g. raging from 9 to 24 point) on various types of paper. Additionally, such a printer may communicate with a processor (described herein) via an RS232/IEEE 12834 and/or bi-directional parallel connection. Such a printer may further comprise a 4 KB data buffer.

Additionally, in some embodiments, an output device comprises an audio module, such as an audio speaker, that outputs information to customers audibly. Speakers may comprise conventional speakers or modern hypersonic speakers. An output device may include unidirectional or hypersonic speakers which can selectively focus sound to particular locations or customers, while not disturbing others who are not in the location of the focused sound. For a description of such speakers, see Suzanne Kantra Kirschner, "We've heard hypersonic sound. It could change everything", Popular Science, available at http://www.popsci.com/popsci/science/article/0,12543,351353,00.html.

In some embodiments, an output device may comprise a physical device having a game theme, such as a spinning "prize wheel" similar to those featured on the television game show "Wheel of Fortune™" or "The Price is Right™", a roulette wheel, mechanical slot machine reels, or the like.

Such a wheel may communicate to customers various information. For example, the wheel may spin and stop on an icon which represents, e.g., a prize entitlement. A physical wheel in the general appearance of the wheel on the "Wheel of Fortune" game show may be attached to a vending machine.

Besides a wheel, another output device which is a peripheral device attached to and in communication with the vending machine can communicate game-related information. By utilizing such an output device, conventional vending machines could be retrofitted with a separate device to employ game-themed promotions. The use of removable peripheral devices may be important in certain situations (e.g., where doorways to interior locations are low), as such satellite devices may be removed during transport and attached once vending machines are brought to the intended location. Likewise, such peripheral devices may be side-mounted, where the ceiling height may impair other location of the peripheral. Further, the use of a separate device is advantageous in that it may be in communication with more than one vending machine, allowing many machines to participate in game-themed vending promotions.

An input device may comprise one or more of (1) a set of alpha-numeric keys for providing input to the vending machine, such as the Programmable Master Menu® Keypad, (2) a selector dial, (3) a set of buttons associated with a respective set of item dispensers 174, (4) a motion sensor or other sensor 176, (5) a barcode reader, (6) a Dual-Tone Multi-Frequency (DTMF) receiver/decoder, (7) a wireless device (e.g. a cellular telephone or wireless Personal Digital Assistant, and RFID transceiver), (8) cameras, such as digital video and/or digital still photographic cameras, (9) a voice recognition module, (10) a fingerprint reader, (11) a topical facial pattern scanner/reader, (12) an iris or retinal scanner, (13) a microphone, (14) an infrared receiver, and/or (15) any other device capable of receiving a command from a user and transmitting the command to a processor.

As described, in some embodiments, a touch-sensitive screen may be employed to perform both input and output functions. Suitable, commercially available touch screens for use in accordance with the present invention are manufactured by Elo TouchSystems, Inc., of Fremont, Calif., such as Elo's AccuTouch series touch screens. Such touch screens may comprise: (i) a first (e.g., outer-most) hard-surface screen layer coated with an anti-glare finish, (ii) a second screen layer coated with a transparent-conductive coating, (iii) a third screen layer comprising a glass substrate with a uniform-conductive coating. Further, such touch screens may be configured to detect input within a determined positional accuracy, such as a standard deviation of error less than ±0.080-inch (2 mm). The sensitivity resolution of such touch screens may be more than 100,000 touchpoints/in$^2$ (15,500 touchpoints/cm$^2$) for a 13-inch touch screen. For such touch screens, the touch activation force required to trigger an input signal to the processor (described herein) via the touch screen is typically 2 to 4 ounces (57 to 113 g). Additionally, touch screens for use in accordance with embodiments of the present invention may be resistant to environmental stressors such as water, humidity, chemicals, electrostatic energy, and the like. These and other operational details of touch screens (e.g., drive current, signal current, capacitance, open circuit resistance, closed circuit resistance, etc.) are well known in the art.

A vending machine may further comprise one or more inventory storage and dispensing mechanism(s). Product inventory storage and product dispensing functions of a vending machine configured in accordance with a snack machine embodiment of the present invention may include one or more of: (i) a drive motor, (ii) metal shelves, (iii) a product delivery system (e.g. a chute, product tray, product tray door, etc.), (iv) dual spiral (i.e. double helix) item dispensing rods, (v) convertible (i.e. extendable) shelves, and/or (vi) a refrigeration unit.

In some embodiments, a vending machine may be housed in a casing of the model 129 SnackShop manufactured by Automatic Products™. In such embodiments, three removable shelves may be employed, together providing for thirty product rows and an inventory capacity of between 185 and 522 commonly vended snack products.

Inventory storage and dispensing mechanism(s) may comprise one or more of: (i) metal and/or plastic shelving, (ii) item dispensing actuators/motors, (iii) product delivery chutes, and/or (iv) a refrigeration unit. Further details concerning vending machine inventory storage and dispensing mechanisms are well known in the art.

A vending machine may include or be in communication with a peripheral device. A peripheral device may be a device that obtains (e.g., receives or reads) information from (and/or transmits information to) one or more vending machines. For example, a peripheral device may be operable to obtain information about transactions being conducted at a vending machine, such as the initiation of a transaction, an amount of money deposited for a transaction and/or a product selected during a transaction. For example, a peripheral device may monitor activities carried out by a processor of a vending machine. In one embodiment, one or more of the processor, the input device(s), RAM, ROM, output device(s) and a data storage device may be included, wholly or partially, in a peripheral device.

An example of a peripheral device is the e-Port™ by USA Technologies Inc. The e-Port™ is a credit and smart card-accepting unit that controls access to office and MDB vending equipment, and serves as a point of purchase credit card transaction device. The e-Port™ includes an LCD that allows for the display of color graphics, and a touch sensitive input device (touch screen) that allows users to input data to the device. The display may be used to prompt users interactively with, e.g., promotions and information about their transaction status.

A peripheral device may be operable to receive input from customers, receive payment from customers, display messages to customers and/or exchange information with devices, such as a controller, a POS terminal, another vending machine. A peripheral device may be operable to instruct a vending machine that appropriate payment has been received (e.g., via a credit card read by the separate device) and/or that a particular product should be dispensed by the vending machine. Further, a peripheral device may be operable to instruct the vending machine to execute process steps and/or output messages. Further, a peripheral device may be operable to instruct the vending machine to execute game-themed promotions or price changes.

The functions described herein as being performed by a peripheral device controller and/or a peripheral device may, in one or more embodiments, be performed by the controller (in lieu of or in conjunction with being performed by a peripheral device controller and/or a peripheral device).

In one or more embodiments, a peripheral device may be useful for implementing the embodiments of the present invention into the operation of a conventional vending machine. For example, in order to avoid or minimize the necessity of modifying or replacing a program already stored in a memory of a conventional vending machine, an external or internal module that comprises a peripheral device may be inserted in or associated with the vending machine. For example, a conventional vending machine may be retrofitted with a peripheral device in order to implement one or more embodiments of the present invention.

A peripheral device may include (i) a communications port (e.g., for communicating with one or more vending machines, peripheral device controller, another peripheral device, and/or controller); (ii) a display (e.g., for graphics and/or text associated with a promotion), (iii) another output means (e.g., a speaker, light, or motion device to communicate with a customer), (iv) a benefit providing means (e.g., a printer and paper dispensing means), and/or (v) an input means.

In one or more embodiments, the peripheral device may direct a vending machine to perform certain functions. For example, a program stored in a memory of peripheral device may cause a processor of a vending machine to perform certain functions. For example, a program stored in a memory of peripheral device may cause a processor of a vending machine to dispense one or more products, dispense a monetary amount, refrain from dispensing a monetary amount, refrain from outputting a product, and/or communicate with another device.

Note that, in one or more embodiments, a vending machine and a peripheral device that is associated with the vending machine may not communicate with one another at all. In some embodiments, however, each may communicate with a computer or other device. For example, a vending machine may communicate with a controller and an associated peripheral device may communicate with a controller. For example, if both the vending machine and the peripheral device are in communication with a controller, each may obtain information associated with the other through the controller.

A vending machine may include a cabinet constructed from, for example, any combination of (1) commercial grade (e.g., sixteen-gauge) steel (e.g., for exterior panels and internal shelving), (2) transparent materials such as glass or Plexiglas (e.g., for product display window), (3) rubber (e.g., for waterproofing insulation), (4) plastic, (5) aluminum, and/or (6) any suitable material.

Many commercially available machine cabinets can be modified to work in accordance with the embodiments of the present invention. For example, in snack machine embodiments, a suitable machine casing may comprise the 129 SnackShop™ manufactured by Automatic Products International, Ltd.™ of Saint Paul, Minn., which stands at 72"/1829 mm wide, has a width of 38⅞"/988 mm, and a depth of 35"/889 mm. Other suitable snack machine casings include the A La Carte™ machine from Automatic Products™, and the GPL SnackVendor™ model #159 from Crane Merchandising Systems/Crane Co.™ of Stamford, Conn.

In beverage machine embodiments, machine cabinets commercially available from Dixie Narco™, Inc. of Williston, S.C. may be employed. Beverage machine cabinets may comprise a "cooler" or "glass front" style front panel, featuring a transparent front panel (e.g. glass) enabling customers to see inventory for sale. Alternatively, beverage machine casings may comprise a "bubble front" style front panel, featuring a decorative front panel, typically used to advertise a logo of a product manufacturer commercially interested in the vending machine's operation.

Other embodiments are contemplated as well, including combination snack and beverage vending machine embodiments, such as those available from Crain Co.™. Further details concerning the suitability of machine casing/cabinetry are well known in the art, and need not be described in further detail herein.

Embodiments of the present invention can be configured to work in a network environment including a computer that is in communication, via a communications network, with one or more vending machines. The computer may communicate with the vending machines directly or indirectly, via a wired or wireless medium such as the Internet, LAN, WAN or Ethernet, Token Ring, or via any appropriate communications means or combination of communications means. One or more of the vending machines may comprise computers, such as those based on the Intel® Pentium® processor, that are adapted to communicate with other computers. Any number and type of machines may be in communication with any computer.

Communication between the vending machines and the computer, and among the vending machines, may be direct or indirect, such as over the Internet through a Web site maintained by computer on a remote server or over an on-line data network including commercial on-line service providers, bulletin board systems and the like. In yet other embodiments, the vending machines may communicate with one another and/or the computer over RF, cable TV, satellite links and the like.

Some, but not all, possible communication networks that may comprise the network or be otherwise part of the system include: a local area network (LAN), a wide area network (WAN), the Internet, a telephone line, a cable line, a radio channel, an optical communications line, and a satellite communications link. Possible communications protocols that may be part of the system include: Ethernet (or IEEE 802.3), SAP, ATP, Bluetooth™, and TCP/IP. Communication may be encrypted to ensure privacy and prevent fraud in any of a variety of ways well known in the art.

Those skilled in the art will understand that vending machines and/or computers in communication with each other need not be continually transmitting to each other. On the contrary, such vending machines and/or computers need only transmit to each other as necessary, and may actually refrain from exchanging data most of the time. For example, a vending machine in communication with another machine via the Internet may not transmit data to the other machine for weeks at a time.

In an embodiment, a server computer may not be necessary and/or preferred. For example, embodiments of the present invention may be practiced on a stand-alone vending machine and/or a vending machine in communication only with one or more other vending machines. In such an embodiment, any functions described as performed by the computer or data described as stored on the computer may instead be performed by or stored on one or more vending machines.

In other embodiments, a vending machine may be in communication with a remote computer, such as a server, that provides the vending machine with and/or receives from the vending machine, e.g., all or some of the data and/or functionality described herein. Thus, in certain embodiments, the server may comprise certain elements or portions of certain elements such as a data storage device/memory.

In such an embodiment, a remote computer could be accessible, directly or indirectly, via a second computer (communicating over the Internet or other network) by a customer or another operator. Accordingly, a customer or other operator of the second computer (e.g. an owner of the vending machine) could communicate with the remote computer via a Web browser. The second computer could, e.g., receive from the remote computer messages described herein as being output by the vending machine, and/or transmit to the remote computer input described herein as being provided to the vending machine. Similarly, various data described herein as received through an input device of a vending machine may be received through a Web browser communicating with a remote server, which in turn communicates with the vending machine. Thus, an owner/operator of the vending machine can operate a remote device to remotely poll and/or report; to transmit new business rules to the vending machine; and the like.

In one embodiment, a software-based control system executes instructions for managing the operation of the vending machine, and in particular in accordance with the inventive functionality described herein. Such vending machine operations include, but are not limited to: (1) item pricing (e.g. displaying prices via an LED, changing such prices where appropriate, etc.), (2) processing vending transactions by (i) receiving customer selections via an input device, (ii) processing payment via a payment processing mechanism, and (iii) actuating corresponding item dispensing mechanisms, (3) configuring subscription offers, (4) outputting subscription offers to customers via output devices (including display of game-themed graphics/content on LCD and LED displays), and (5) recording transaction information (inventory levels, acceptance rates for promotions, redemptions, etc.).

In some embodiments, machine peripherals (e.g. machine hardware, including mechanical hardware such as input devices, output devices, inventory dispensing mechanisms, and payment processing mechanisms including coin acceptors, bill validators, card readers, change dispensers, etc.) will be controlled by the software-based control system through a standard RS-232 serial interface. In such embodiments, embedded API/devices may be used to enable the software to actuate/control vending machine peripherals via RS-232 connectivity. Such vending machine peripherals may be operatively connected to the control system directly or indirectly, in any manner that is practicable.

As illustrated by FIG. 1, in one embodiment, control software can be divided into three abstract components. Such division may provide a clear partition of tasks, which may be desirable so that any future modification and new programming can be applied without disrupting other components. Turning to FIG. 1, the three abstract components are illustrated, including a Business Logic component 10, a Control Layer component 20, and an exemplary Machine Peripheral component 30. As stated earlier, more machine peripherals may be employed. The Business Logic component 10 is connected to Control Layer component 20 via API 15; Control Layer component 20 is connected to Machine Peripheral component 30 via API 25.

The Business Logic component 10 visually represents the portion of the software that determines benefit offers, as discussed herein. Such a component may access a rules database and an inventory database to perform such functions. The Control Layer component 20 visually represents the portion of the software which interfaces with at least one Machine Peripheral component 30, and thereby transmits commands to perform such functions as: (i) outputting offer information via an output device (i.e. a Machine Peripheral component 30), (ii) dispensing products via a product dispensing mechanism (i.e. a Machine Peripheral component 30), (iii) dispensing change due to a customer via a payment processing mechanism, which may include a change dispenser and a currency storage apparatus (i.e. several Machine Peripheral components 30). As stated, the Machine Peripheral component 30 generally represents machine hardware, including mechanical hardware such as input devices, output devices, inventory dispensing mechanisms, and payment processing mechanisms including coin acceptors, bill validators, card readers, change dispensers, etc.

3. Process Steps

Various methods for improving the establishment and management of vending machine subscriptions are disclosed herein. Generally, according to an embodiment of the present invention, a subscription may be processed by a vending machine by (1) determining a subscription offer, (2) outputting a subscription offer, (3) registering a subscription, and (4) processing the redemption of subscription items. Various embodiments are disclosed for alternate methods of performing these steps and other steps, as may be desirable or suitable in different contexts.

3.1 Determine a Subscription Offer.

The vending machine control system may determine subscription offers in one or more of a plurality of ways. In one embodiment, as described in Applicant's U.S. Pat. Nos. 6,298,972, 6,085,888, and 5,988,346 (each of which is incorporated herein by reference) subscription terms associated with offers may be predefined and stored in a database accessible to the control system. In other embodiments, as discussed herein, subscription terms may be constructed dynamically according to stored rules that consider, e.g., the supply of and demand for vending machine inventory.

Subscriptions may include a term defining particular products (e.g. Coke® soda) or categories of products. Categories of products may include, for example, (1) product types (e.g. soda, which includes Coke®, Sprite® and A&W® Root Beer soda), (2) products that have a price with certain characteristics (e.g. products priced at $0.50, products priced between $0.50 and $0.75), and/or (3) products within a certain "inventory group" (e.g. drinks which are indicated by an illuminated, colored LED adjacent the drink). The one or more products which a category includes can change over time, or remain unchanged. The customer may, but need not, be informed that the products that a category includes are subject to change.

Therefore, the customer (who can redeem products pursuant to a subscription including one or more product categories) can redeem products which may be unknown to the customer, and which may remain unknown to the customer.

For example, the products in a first product category (e.g., a "red" product category) might include different items at each of the following times (all of which are, in this example, at different times): (a) when a subscription is offered to a customer, (b) when that customer accepts the offer, (c) when the customer redeems a first product of the subscription, (d) when the customer redeems a second or subsequent product of the subscription.

Revenue and profit management functionality may be employed in various embodiments, such as embodiments involving subscriptions for categories of products. For example, the methodology disclosed in commonly-owned, co-pending U.S. patent application Ser. Nos. 08/947,798, entitled METHOD AND APPARATUS FOR DYNAMICALLY MANAGING VENDING MACHINE INVENTORY PRICES, which is incorporated in its entirety herein for all purposes; U.S. patent application Ser. No. 10/968,282, filed Oct. 18, 2004, entitled PRODUCTS AND PROCESSES FOR PROMOTING MULTIPLE TRANSACTIONS AT A RETAIL ESTABLISHMENT, which is incorporated in its entirety herein for all purposes; U.S. patent application Ser. No. 10/855,247, filed May 27, 2004, entitled METHOD AND APPARATUS FOR MANAGING VENDING MACHINE OFFERS, which is incorporated in its entirety herein for all purposes; and U.S. patent application Ser. No. 10/902,397, entitled PRODUCTS AND PROCESSES FOR VENDING A PLURALITY OF PRODUCTS, which is incorporated in its entirety herein for all purposes, may be employed so that, during a redemption transaction, the products which are available for redemption (e.g., because they are included in a "product category") may be determined based on the values, or changes in values, of supply and demand.

In some embodiments, a subscription may be defined by the ability to redeem (i) a predetermined number, (ii) of products of a certain type (e.g., drinks), and/or (iii) which products each have a certain price or a price within a certain range (e.g., $0.50, less than $0.75). For example, if a subscription is defined by the ability to redeem a number of drinks which have a price of $0.50, price-management functionality may be employed to determine which products may be redeemed pursuant to that subscription (i.e. determine products which have prices that are, or have decreased to, $0.50 or less, and such products would accordingly be eligible for redemption). Or, if a customer subscribes to items in the "red" inventory group, "inventory grouping" functionality described in U.S. patent application Ser. No. 10/902,397 may be used to determine (e.g., based on criteria such as profitably) which items should be allocated to the red inventory group, and thus redeemable by the customer during a redemption transaction. Subscriptions to inventory groups could be marketed to customers as "value" or "club price" subscriptions to clearance items.

Terms which a subscription includes may be defined/generated/selected based on one or more of various criteria, such as the characteristics of the customer, the actions of the customer, the previous purchases of the customer, the redemption patterns of the customer, products that the customer has purchased or attempted to purchase, products that the customer has redeemed, frequency of redemption of products.

3.2 Output a Subscription Offer.

A customer may select a subscription or otherwise request and/or receive a subscription, either with or without having received or responded to an offer (e.g., from the vending machine) to receive a subscription. For example, a customer may select or activate a subscription that has terms equivalent or similar to terms of a subscription that the customer previously held (e.g., "renewing" an old subscription). Similarly, the customer may select or activate a subscription that has terms equivalent or similar to terms of a subscription that the customer currently holds, but is expiring (e.g., "renewing" an expiring subscription).

It can be advantageous to output subscription offer when a subscription is close to expiration (e.g., when five days remain before a subscription expires and is no longer usable without renewal or recharging). It can further be advantageous to output a series of subscription warnings and/or offers (e.g., through email, phone calls using registered contact information) to the customer when the customer's subscription is close to expiration.

Alternatively, an offer to receive a subscription may be output to the customer, who may accept or reject the offer. In one embodiment, as disclosed in Applicant's U.S. Pat. Nos. 6,298,972, 6,085,888, and 5,988,346, predefined subscription offers are output to all customers routinely (e.g., upon detecting that a customer arrives at a vending machine, upon a customer providing payment to the vending machine). However, in another embodiment, subscription offers may be "triggered" upon the occurrence of certain conditions (and therefore one or more subscription offers are provided upon the occurrence of such conditions). That is, stored rules may provide that certain offers are to be output to customers upon the occurrence of certain conditions detectable by the vending machine control system. In Applicant's co-pending U.S. patent application Ser. No. 10/855,247, Applicants disclosed provided vending machine subscription offers in response to a customer's selection of a particular product. Further, Applicants disclosed an embodiment therein in which customers who have already deposited the amount necessary for the purchase of a single unit are offered a subscription for an amount equal to his or her change due. For example, if the customer deposits $5.00 and selects an item priced at $0.50/unit, the machine may offer 12 units redeemable over the span of several days in exchange for the $4.50 that otherwise would be returned to the customer. Alternatively, customers who have already deposited the amount necessary for the purchase of a single unit may be prompted (e.g., through text displayed on an output device of the vending machine) to deposit additional currency in order to accept a subscription offer.

Subscription offers may also be triggered in other ways. In some embodiments, one or more subscription offers may be triggered upon the deposit of (i) a particular amount of currency, (ii) a particular denomination of currency, and/or (iii) a particular type of payment (e.g., currency, coins, paper bills, credit card, debit card, payment code, coupon, voucher) that is used or to be used.

Figure 3:
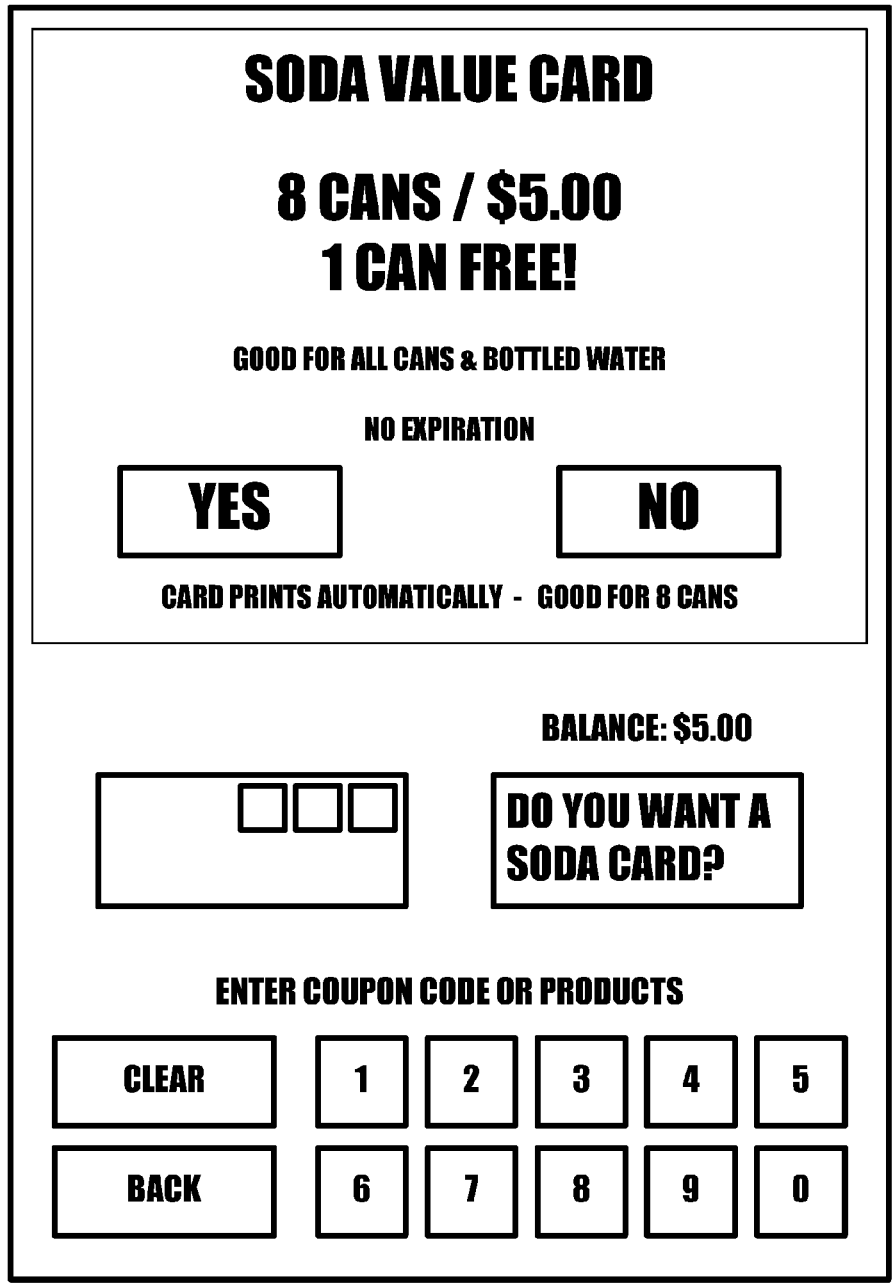
FIG. 3 is an illustration of a display that presents an offer for a subscription according to an embodiment.

The terms of the offered subscription can depend on, e.g., the amount of currency deposited. For example, as illustrated by FIG. 3, if a customer deposits a $5 bill into a vending machine's bill validator, the vending machine control system may be programmed (e.g., through stored rules) to output one or more (predefined or dynamically-configured) subscription offers. Table 1 below illustrates an example database defining rules for the predefined subscription offers which are output based on particular deposit amounts being received.

TABLE 1

| Deposit Amount | Subscription Offer Terms and Conditions | Subscription Offer Content |
| --- | --- | --- |
| $ 5 | Subscription to 6 cans of Sprite ® soda | "Get a free can of Sprite ® by subscribing to 6 cans of Sprite for your deposited $5! Just press ACCEPT button on touch screen now and receive soda card from printer." |
| $10 | Subscription to 12 cans of Sprite ® soda | "Get two free cans of Sprite! Subscribe to 12 cans of Sprite for your deposited $10. Just press ACCEPT button on touch screen now." |
| $20 | Subscription to 25 cans of Sprite ® soda | "Save 20%! Subscribe to 25 cans for your $20. Just press ACCEPT button on touch screen." |

For each of the three example subscription offers described above in Table 1, there is a corresponding unit price per item ($5/6 cans=$0.83 per can; $10/12 cans=$0.83 per can; $20/25=$0.80 per can). Assuming in this example that a can of Sprite® soda has a retail price of $1 per can, this retail price is larger than any of unit price per item for any of the subscriptions in Table 1. Thus, a customer who wants to acquire the respective number of cans will save money (when compared to the per can retail price) by purchasing any of the three subscription offers described in Table 1.

Some terms of a subscription may become available to current or previous owners of subscriptions (e.g., upon renewal of a subscription). For example, the unit price per item may decrease with successive purchases of a $5 subscription (e.g., first subscription provides 6 units, the next 7 units and subsequent subscriptions provide 8 units for the same subscription holder). In one embodiment, failing to renew a subscription in a timely manner can cause the loss of a significant benefit—smaller unit prices per item.

In an embodiment, the terms of a subscription may define that the money paid for the subscription is fully or partially paid for by a third party instead of the customer. Such an arrangement may be in exchange for the customer agreeing to transact with the third party in some way. For example, a subscription for six cans of soda per week without payment could be offered to a customer in exchange for the customer applying for and being approved for a Visa® credit card from a particular bank.

In some embodiments, the terms of a subscription and/or the conditions under which an offer for a subscription are provided may be determined according to stored rules, such as stored rules that consider supply and/or demand for various products provided by a vending machine. For example, subscription offers may be dynamically constructed (e.g., using relational databases and/or evaluating various data as described by Applicants) by identifying and selecting a product having particular characteristics. Table 2 below illustrates an exemplary subscription offer rules database for use in such an embodiment. Each of the rules shown in Table 2 indicates (among other things) a method for selecting a product to offer, such as "the canned soda product that has the greatest ratio of actual velocity to ideal velocity".

TABLE 2

| Time until end of fill period | Subscription Offer Construction Rules | Subscription Offer Content |
| --- | --- | --- |
| 3 days until end of fill period | Output offer for subscription to the canned soda product that has the greatest ratio of actual velocity to ideal velocity. Terms: 8 sodas for $5. | "Subscribe to 8 cans of [soda X] for $5. Press ACCEPT button on touch screen now!" |
| 5 days until end of fill period | Output offer for subscription to the soda product with the greatest profit margin. Terms: 12 sodas for $10. | "Subscribe to 12 cans of [soda Y] for $10. Press ACCEPT button on touch screen now!" |
| 10 days until end of fill period | Output offer for subscription to the soda product with the most units in inventory. Terms: 25 sodas for $20. | "Subscribe to 25 cans of [soda Z] for $20. Press ACCEPT button on touch screen now!" |

Thus, by referencing such rules (e.g., which may be stored in a local database, which may be remotely accessible via a server) and an inventory database (or other structure) which records or tracks, for each product, such data as the product name/identifier, category (e.g. "soda"), price, cost, target sales rate, actual sales rate, and the like, the vending machine control system can determine, at an appropriate time in the fill period, how to populate the appropriate subscription offer content, thereby dynamically constructing subscription offers.

In a dynamic offer construction embodiment, terms of a subscription offer may be dynamically constructed according to, for example, the actual and/or ideal sales rate of a particular product. For example, based on a product's actual sales rate, the vending machine control system may determine that, at the current retail price (which of course affects the actual sales rate), the product is not likely to equal or exceed its ideal sales rate. Therefore, the vending machine control system may determine that, as a result, the vending machine will likely have units of the product remaining at the end of the fill period, absent a promotion or other mechanism which increases sales volume for the product. Accordingly, the control system may dynamically construct subscription offer terms for the product, which are designed to clear the inventory of the product by the end of the fill period by, e.g., spurring increased sales volume of the product.

For example, assuming a product was originally stocked with ten units at the beginning of a 10-day fill period, the product's ideal sales rate would be one unit per day. Assuming further that the retail price is set at $1.00, and that the actual sales rate is 0.5/day, it may be determined (using revenue management techniques, as are known) that the price per unit should be set to $0.50 in order to sufficiently stimulate demand so that supply is depleted by the end of the fill period. Thus, assuming there are six units remaining in inventory, the control system may construct a subscription offer for six units at $3, reflecting a price savings of $0.50/unit.

Such an embodiment may be desirable as it allows vending machine operators to deeply discount inventory while guaranteeing a sufficiently offsetting sales volume through the subscription offer. That is, such subscription offers are superior to simply discounting per unit retail prices because customers are required to pre-purchase enough units to justify the discount.

In further embodiments, construction of such dynamically-determined subscription terms (e.g. subscription prices, quantities, products) might be based on (1) the expected demand that results from a particular subscription or set of subscriptions (i.e., by acknowledging that "subscription" offers may have different demand characteristics than per unit sales at retail prices), and (2) the expected redemption rate for items in such subscriptions.

In yet another dynamic offer construction embodiment, subscription offers are generated according to overall patterns in sales occurring via the vending machine. For example, if sales volume at a particular machine is below a certain threshold (e.g. two transactions/hour) during one or more particular period of times (e.g., "off peak" times, such as between the hours of 7:00 PM and 7:00 AM each day), then subscription terms may be defined in which redemption of subscription items is only be permitted during such off-peak times (or during other periods, as desirable). Thus, the subscription includes a term that defines a predetermined period of time for redemption that is a time of otherwise low volume sales.

Further, in one such embodiment, vending machine subscription offers with off-peak redemption conditions may be output if the vending machine determines, via a motion detector or other sensing device, that there are many unsatisfied customers (e.g., detecting that the ratio of people in the vicinity of the vending machine during a certain period of time to the number of people transacting within the period of time surpasses a certain threshold, indicating that several potential customers are not getting served as a result of high demand and long lines). Thus, subscription offers with off-peak redemption conditions can help to balance the overall demand for vending machine products throughout the fill period.

Many other embodiments with respect to subscription terms are contemplated and readily apparent to one of ordinary skill in the art. In various embodiments, subscription activity periods may begin and/or expire based on fill periods (restock dates). Further, in some embodiments, subscription terms may be customizable. For example, customers may input a request to purchase a subscription to a certain quantity of a product or products. The vending machine control system may then calculate a price and/or terms for the requested subscription based on revenue and profit management considerations (e.g. current sales rates, ideal sales rates). For example, if the requested items are in high demand and short supply, the vending machine control system may determine that the subscription price should be set at, e.g., a 2% discount relative to the subscription items' retail prices. Additionally or alternatively, the vending machine control system may output subscription terms that account for the high demand nature of the requested products by, for example, requiring the customer to accept at least one out-of-stock event during the subscription period.

The terms of a subscription and/or the conditions under which an offer for a subscription are provided may be defined with respect to a predetermined amount of expenditures, such as a predetermined dollar amount that may be spent on promoting particular products. For example, a one million dollar budget may be allocated to funding discounts on a particular product across all vending machines for an estimated period of time.

The terms of a subscription and/or the conditions under which an offer for a subscription are provided may be determined by a person, such as a supervisor responsible for managing vending machines in a predetermined area.

In some embodiments, a subscription may include terms such that a customer can redeem one or more of at least two types of product. For example, a customer may subscribe to a "package" which permits the customer to redeem 5 beverages and 5 snacks.

In some embodiments, a subscription may include terms such that a customer can redeem subscription items from more than one vending machine. For example, a subscribing customer may receive a first unit from a first machine using a subscription code, and a second unit from a second machine using the same subscription code. Thus, for example, a customer may redeem one item from a snack machine and one item from a beverage machine.

A subscription may define further types of terms regarding redemption of products. For example, the subscription may define the number of products per transaction which must be redeemed. In one embodiment, for every transaction pursuant to a subscription, a customer must redeem two items per transaction (e.g., the customer must select a product from a "red" category and a product from a "green" category).

3.3 Output a Subscription Offer.

Figure 2A:
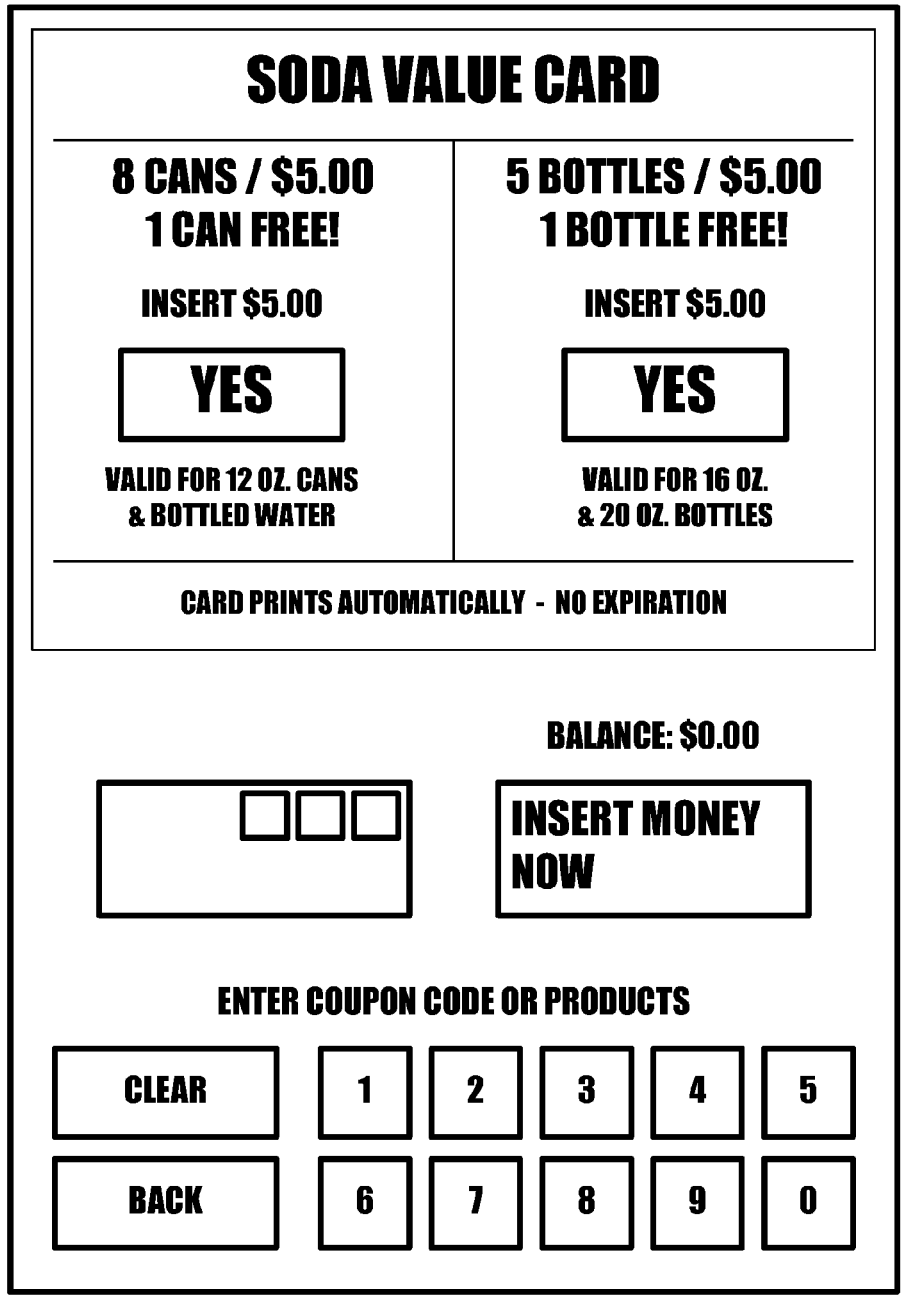
FIG. 2A is an illustration of a display that presents an offer for a subscription according to an embodiment
Figure 2B:
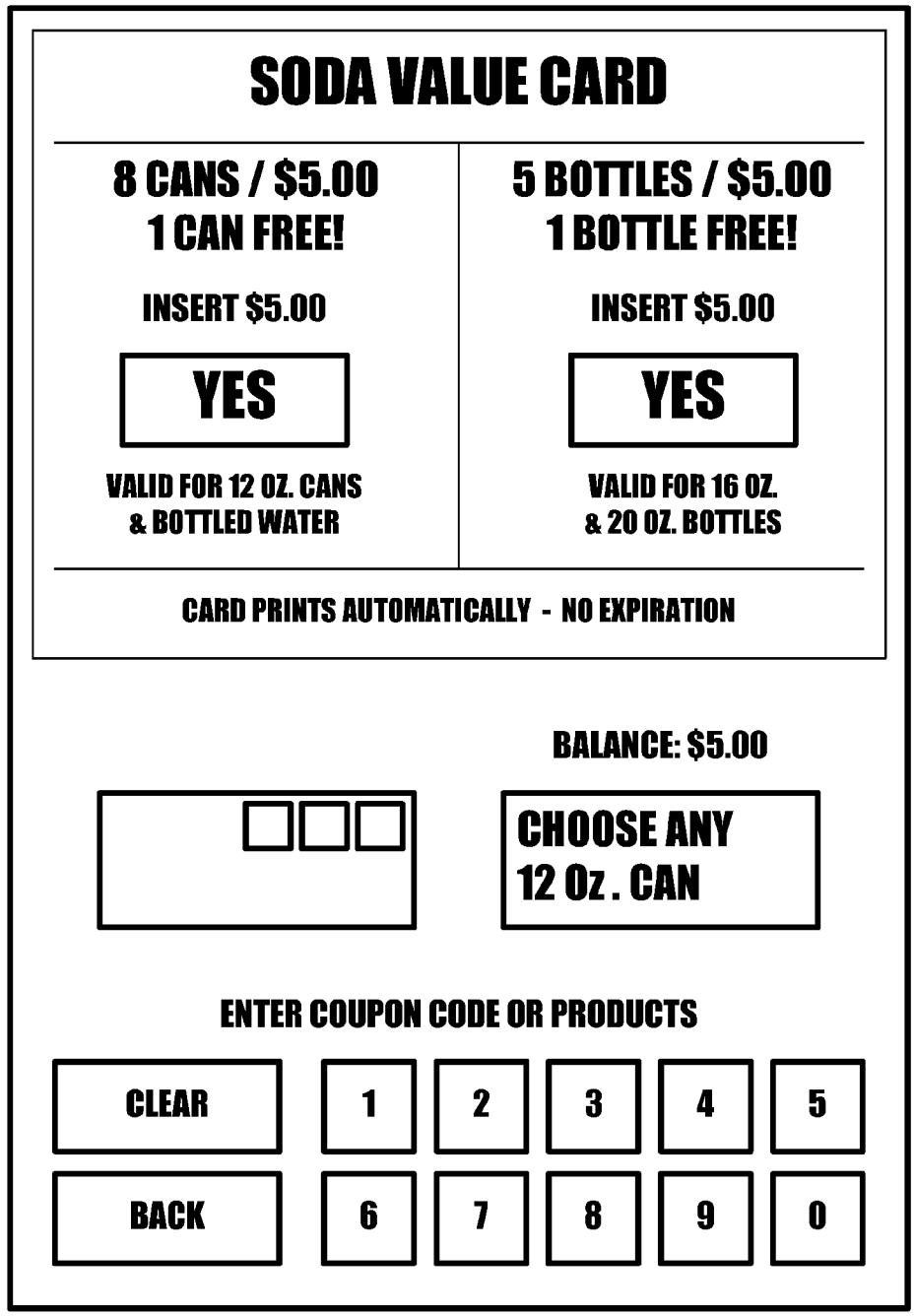
FIG. 2B is an illustration of a display that presents an offer for a subscription according to an embodiment

Offers may be output via any output device of the vending machine, regardless of whether such output device is a component or a peripheral of the vending machine, or is remotely in communication with the vending machine. In some embodiments, offers are output through an LCD display. Exemplary subscription offer content designed for a touch screen or LED/keypad combination is illustrated in FIGS. 2A and 3. FIG. 2A illustrates an embodiment in which a customer is proactively offered a choice to accept one of two subscription offers. FIG. 3 illustrates an embodiment in which a single subscription offer is triggered in response to a customer's deposit of $5.00.

In one embodiment, offers are displayed via a touch screen display so that customers may focus their attention on one location which serves to output information and receive information.

3.4 Register a Subscription Offer and Output Subscription Code.

A customer may accept a subscription offer by so indicating via the vending machine's input device. For example, a customer may accept a subscription offer by pressing a button on a vending machine's touch screen or keypad. In an alternate embodiment, a customer may accept a subscription offer by pressing a button on the keypad of a cellular telephone which communicates (directly or indirectly) with the vending machine or with a server in communication with the vending machine. Further, a customer may accept a subscription offer verbally into a microphone attached to the vending machine or attached to another device, such as a customer's cellular telephone. The vending machine control system may receive an acceptance signal directly of indirectly from a device in communication with the microphone.

Additionally or alternatively, a customer may accept a subscription offer by tendering payment of the subscription price.

Figure 5:
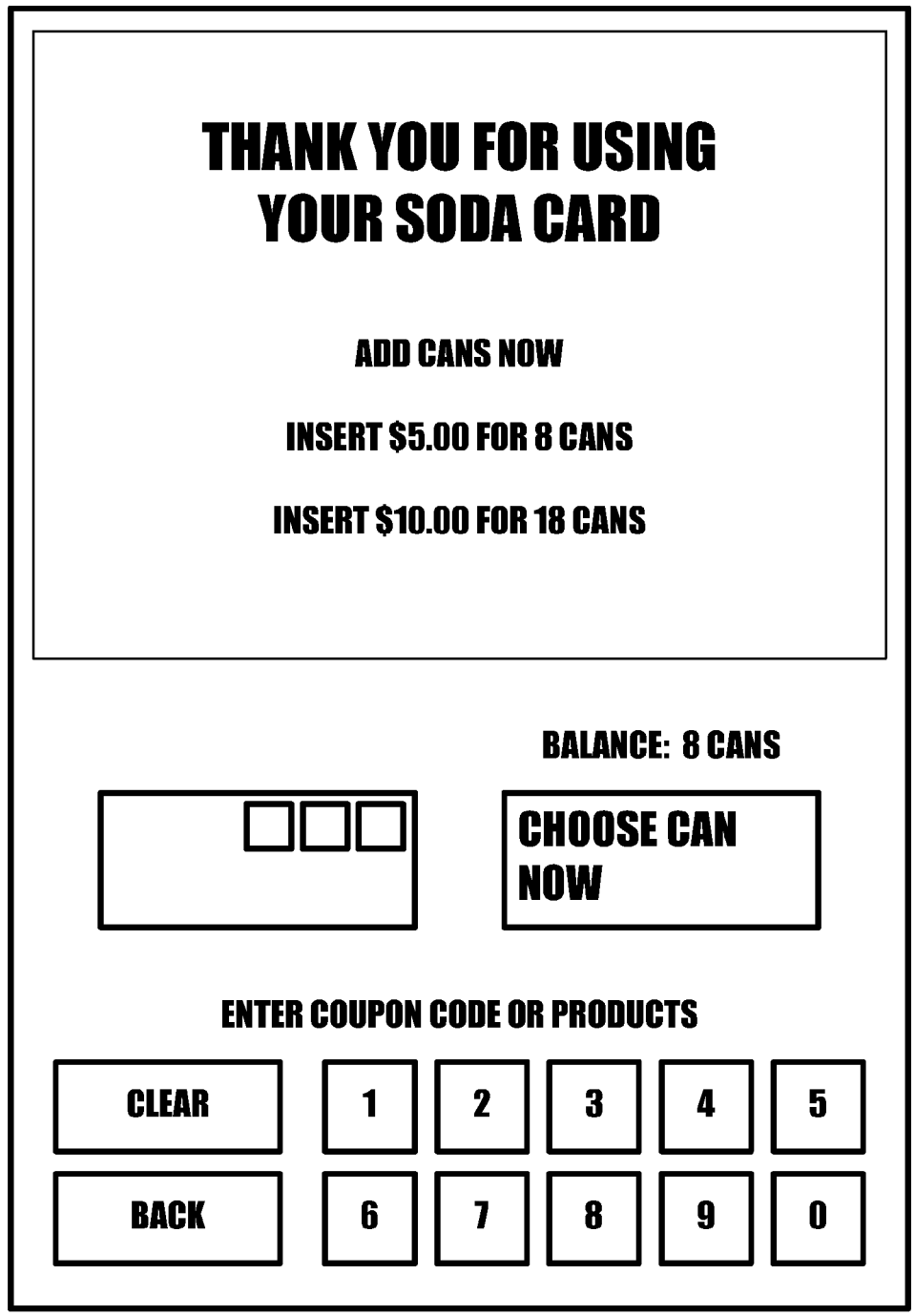
FIG. 5 is an illustration of a display that presents an offer for a subscription according to an embodiment.

Once accepted, a vending machine subscription is registered in a database, such as the illustrative subscription registration table of Applicant's U.S. Pat. Nos. 6,298,972, 6,085,888, and 5,988,346 (FIG. 5 therein). The registered subscription information may include a subscription code, an indication of the quantity remaining in the subscription, and an indication of the terms of the subscription (e.g. subscription expiration date, redemption times).

The subscription code may be generated by the vending machine control system. For example, the code may be generated by a random number generator which generates unique random numbers having predefined characteristics, or may be identified/selected from a list of available (i.e. not-yet-issued) subscription codes.

Alternatively, as described above, the subscription code may be provided by the customer (e.g. the customer's birthday or phone number; the serial number of a five dollar bill entered into the vending machine by the customer; the customer's credit card number; biometric data provided by the customer). The customer may be initially given the option of choosing his own code, or having the vending machine generate a code for the customer without reference to a customer's desired code. This option may take the form of a message on a touch screen, followed by two buttons representing the two choices, in which the customer presses one of the buttons to indicate his desired option.

Further, in embodiments where the customer redeems the first subscription item during the registration transaction, the subscription code may be linked to the first product redeemed in the subscription. For example, the subscription code may be included on the packaging of the first product (e.g. a code underneath a bottle cap; a code identified by a radio frequency transmitter affixed to the product's packaging).

In some embodiments, more than one code is identified and output to the customer. For example, in some embodiments, each prepaid item in the subscription may be associated, in a database, with a different code. In such embodiments, the vending machine may dispense several tokens, such as printed vouchers, each containing a different code generated as described above.

Generally, customers who accept subscription offers may be issued one or more "tokens" which denotes their subscription. For example, the token may be a paper substrate on which is printed a code and terms of the subscription. The vending machine may generate tickets, through a printer, or other printed matter containing subscription information (e.g. an account identifier) in a known manner.

Two tokens may be output where it is desirable, e.g., to allow one to be stored in a safe place in case the first token is lost. In an embodiment where the two tokens are on a paper substrate or the like, the two tokens may be connected, and the interface between them is perforated so that the two can be easily detached form each other.

The ticket may be used by the customer to redeem subscription items upon subsequent visits to the vending machine. For example, the customer may enter a code printed on the ticket via a keypad of the vending machine. The control system would in turn determine whether or not the code is valid, and if so, activate an item dispenser corresponding to the subscribed-to product, and update an account record in a subscription database to reflect the redemption. A printed subscription card containing a subscription code may indicate, via printed indicia, e.g., (1) a number of bottles of a drink the subscription card may be redeemed for, (2) a seven digit code, and (3) an instructional message regarding redemption (e.g., "Good any time at this vending machine only").

One or more of the tokens may be a customer device, such as a PDA, cell phone, watch, or the like. The subscription code, authorization code and/or subscription information may be transmitted via a wired or wireless medium (e.g. infrared, RFID, BlueTooth™, WiFi, firewire port, USB port) to the customer device. The customer device may then be used in redeeming units of the subscription (e.g., to provide the subscription code to the vending machine wirelessly).

In some embodiments, an authorization code as well as a subscription code is output, and the authorization code is then used during, e.g., redemption of units of the subscription. The authorization code functions to authorize the use of the subscription, much like a "PIN" code authorizes the use of certain financial accounts. The authorization code may be generated like the subscription code (e.g., specified by a customer via a keypad).

For example, a first signal may be received from a fingerprint reader (e.g., indicating a representation of a customer's thumbprint) and a second signal may be received from a keypad (e.g., indicating a four digit code). Thus, a fingerprint may serve as a subscription code, and a four digit sequence may serve as an authorization code, or vice versa.

Further, in some embodiments a single code may serve as both the authorization code and the subscription code. For example, a single code, when input, may identify the subscription and also authorize redemption of units of the subscription.

The subscription code and/or the authorization code may be, e.g., a signal received from a cellular telephone, RFID transmitter or other device which identifies the device. For example, cellular telephones emit a signal which, when detected and possibly decoded, indicates the telephone number of the cellular telephone. Thus, placing the cellular telephone within a predefined proximity of a sensor (e.g., a peripheral of a vending machine) can allow the cellular telephone number to be determined, and thus the subscription transaction to be authorized. Similarly, a vending machine can be capable of determining that a call has been placed to a predetermined number (e.g., a telephone number of the vending machine). Thus, the vending machine can identify the phone number (via callerID) of the calling telephone. Thus, the number of the calling telephone may serve as a subscription code and/or an authorization code. Other manners for determining the (unique or fairly distinct) identity of a device to be detected and determined are also known to those of skill in the art.

The subscription code may also be determined from biometric data. For example, a fingerprint reader or eye scanner may detect a biometric signal of a customer, and determine the identifier of the customer and/or the corresponding subscription.

Figure 4:
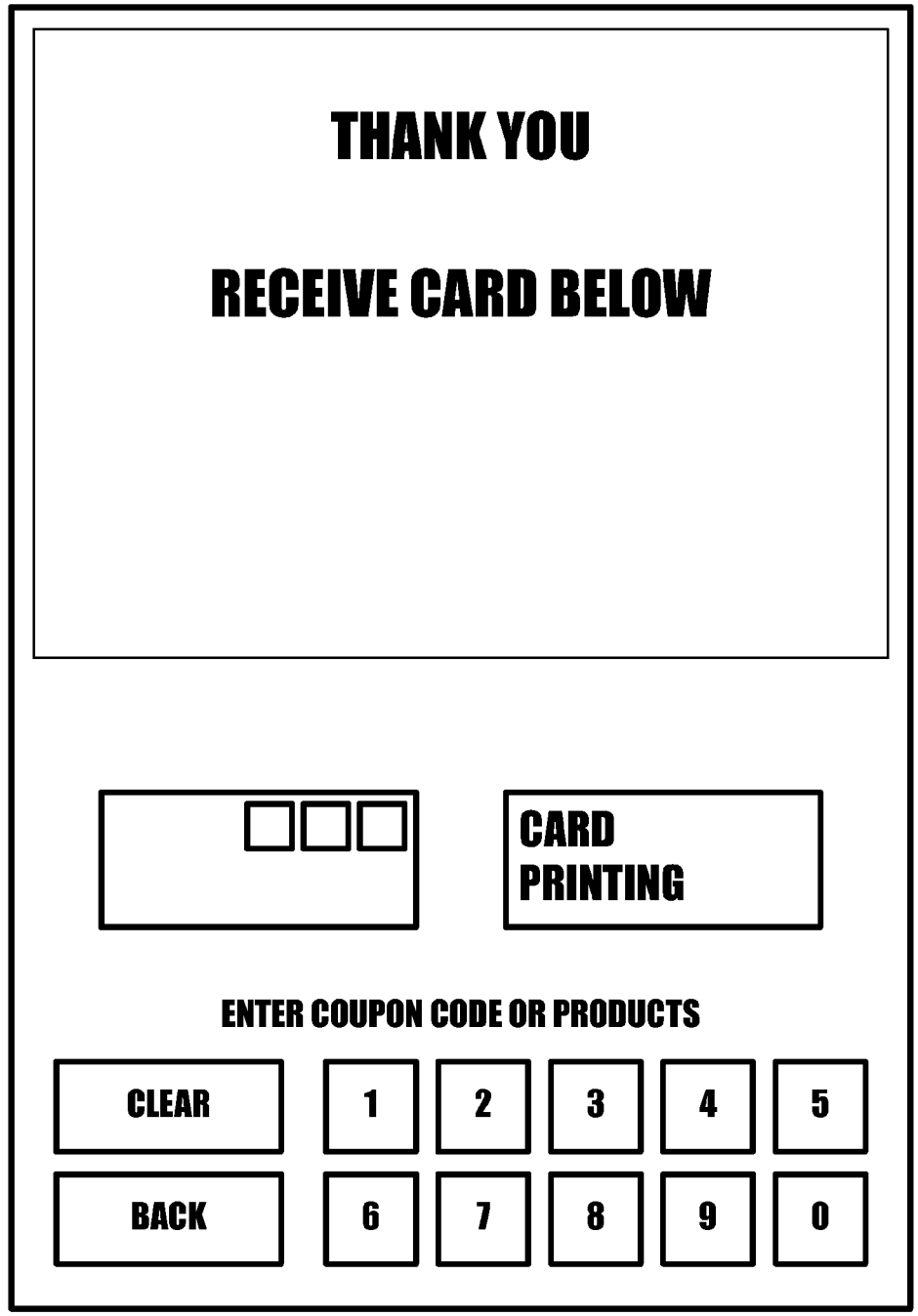
FIG. 4 is an illustration of a display that presents an offer for a subscription according to an embodiment.

In some embodiments, the output of tokens such as subscription cards may be preceded, accompanied by or followed by a message output via a touch screen or LCD, such as the "thank you" message depicted in FIG. 4.

In one embodiment, customers who accept subscription offers may be issued a read/write magnetic stripe card that can be updated upon subsequent visits to reflect the redemption of subscription items. In such an embodiment, the magnetic strip of the card stores subscription information in a known manner, and that subscription information is read by a card reader in a known manner.

In other embodiments, customers who accept subscription offers may be provided with subscription information via other output devices (other than printers), such as LED or LCD displays (e.g. subscription codes may be provided on such displays), audio speakers, or the like. Such customers would be required to remember subscription codes. Thus, in some embodiments, customers may be prompted, as part of the subscription registration step, to provide challenge questions and/or response answers so that, should the customer later forget his code, he may be asked the registered question (e.g. What is your pet's name?) and provided with the code if the customer's answer (e.g. the provided pet name) matches that which was previously stored in a database during the registration step.

In some embodiments, customers may register subscriptions online or remotely, e.g., via a cellular telephone, via a computer/Web-enabled cellular telephone which accesses the Internet. In some such embodiments involving the Internet, customers may (e.g., through a personal computer or Web-enabled cellular telephone) log on a Web site associated with the vending machine operator. Customers may be presented with subscription offers through the Web site, and may register for subscriptions by authorizing credit card charges in amounts corresponding to subscription prices. Other forms of payment include digital currencies, and online payment mechanisms such as the one by PayPal®. In some embodiments, customers are provided with a single subscription code for each subscription. In other embodiments, customers are provided with several subscription codes for a single subscription. In such embodiments, subscription codes maybe emailed to customers periodically (e.g. a new code every week).

In embodiments where customers register for subscriptions online, the issuance of subscription codes may be handled in several ways. In one embodiment, new codes are generated upon registration, and such codes are made available to one or more vending machines (e.g., via an electronic network the vending machines access, via data copied to the vending machine by one or more operators) so that, upon redemption of a subscription item, such vending machines may confirm that presented codes match the issued codes.

In another embodiment, duplicative lists of subscription codes are maintained both by the host computer that facilitates registration, and by the one or more vending machines that facilitate redemption. Thus, in such "duplicative list" embodiments, a real-time communication link need not be established between the vending machine and the registration computer during a redemption transaction.

In another embodiment, the subscription codes may be generated in such a way that duplication by another vending machine is virtually impossible (e.g., the subscription codes are thirty digits long). Thus, vending machines could generate codes without reference to codes on a list maintained by the host computer that facilitates registration.

3.5 Receive Request to Redeem Subscription Item(s).

After a registration transaction has been successfully processed, a customer having a subscription may proceed to use a subscription code to redeem one or more subscription items at a vending machine. Typically, the customer need first indicate to the vending machine that the customer so desires to redeem one or more subscription items.

In some embodiments, a redemption transaction is initiated when a customer sends a signal to the vending machine control system through an input device such as a touch screen or keypad. In some embodiments, a dedicated button of a touch screen or a keypad of keys (real keys or virtual keys on a touch screen) may function to allow customers to initiate a redemption transaction.

In an embodiment, customers may be allowed to fill a virtual "basket" of goods by selecting items and quantities through one or more input devices. The vending machine control system may store an indication of the selected products in a temporary memory, such as stored in RAM. After a customer indicates which item or items he or she wishes to purchase, the vending machine control system may output, through an output device such as a speaker, touch screen and/or LED display, one or more payment options, including but not limited to (1) a cash payment option, (2) an option that allows subscription customers to redeem one or more items with a subscription code, and/or (3) a credit payment option.

The customer may indicate which item or items he or she wishes to purchase by explicitly indicating each of those items. Alternatively, the customer's selection(s) from prior transactions can be stored and offered to the customer. The customer may accept such an offer of a selection by, e.g., pressing an indicated button on a touch screen. For example, the customer's last selection may be offered (e.g., "Press here to order a Sprite® soda and a Snickers® candy bar again"). The customer's selections from the last few transactions may be offered (e.g., and accepted by pressing one of a plurality of buttons). The customer's most commonly selected selections from previous transactions may be offered (e.g., and accepted by pressing one of a plurality of buttons).

Subscription codes may be presented either directly via input devices such as keypads and touch screens, or via machine-readable tokens, such as bar coded vouchers, magnetic stripe cards, RFID transmitters, magnetic devices, etc.

Step 3.6 Determine Whether to Honor Request, and if so, Dispense Subscription Item(s).

After the customer has indicated a desire to redeem a subscription item with a subscription code, the vending machine control system determines whether or not to honor the request, e.g., by determining (1) if the subscription code is valid, and (2) if the requested item is out of stock or otherwise unavailable.

As discussed in Applicant's U.S. Pat. Nos. 6,298,972, 6,085,888, and 5,988,346, subscription codes may be validated, e.g., by determining (a) whether or not the underlying subscription has expired, and/or (b) whether or not all units in the subscription have been redeemed. Such a validation step may be executed by referencing a stored record corresponding to the subscription in a subscription registration table.

For example, if a corresponding record indicates that the customer only has three items remaining in a subscription, he may not be permitted to redeem four items with the corresponding subscription code. Conversely, if a customer has indicated a request to redeem three items, he may be permitted to so redeem the items if his subscription indicates that he has four remaining units in his subscription. Thus, customers may redeem more than one item during a redemption transaction, so long as the vending machine control system can validate the provided subscription code in light of the quantity of unredeemed items in the customer's subscription.

If the subscription code is deemed valid (e.g., corresponds to an entry on a list of approved subscription codes), the vending machine control system would determine whether or not the requested item is out of stock, for example, by consulting an inventory database. Further, the vending machine control system may determine whether or not the requested item is instead reserved for another subscriber, such as a subscriber who has paid a premium to guarantee availability of subscription items (i.e. a "hard reserve" feature) at certain times.

Various methods are contemplated for handling situations where a subscribing customer attempts to redeem a product that is unavailable (e.g., sold-out or reserved for another subscribing customer), including: (1) offering a better or comparable substitute product (Methods for determining substitute products are disclosed in Applicant's co-pending U.S. patent application Ser. No. 09/345,094, entitled VENDING MACHINE SYSTEM AND METHOD FOR ENCOURAGING THE PURCHASE OF PROFITABLE ITEMS, the entirety of which is incorporated by reference herein), (2) adding one or more additional units to the registered subscription of the customer, and/or (3) offering "value" back to the customer, including but not limited to (i) refunds or rebates for the full retail price of the item requested, (ii) refunds or rebates for the price paid per unit of the subscription item, and/or (iii) sweepstakes entries. In some embodiments, refunds or rebates may take the form of cash or vouchers for machine credit. Vouchers for machine credit may optionally have usage restrictions associated therewith, such as time windows for usage and expiration dates.

In addition, if requested products are unavailable to a subscribing customer (e.g., items are sold-out or reserved for other subscribing customers), then output devices may be configured to output one or more messages, such as informational messages. In one embodiment, "reserved" products are so indicated through LED lights or any other output device. Further, in some embodiments, an "assurance" message is output to the subscribing customer who is denied the ability to redeem a requested item during a redemption transaction. For example, a message may be communicated through a touch screen, reading "Don't worry, you still have 8 sodas in your subscription to redeem at a later time." Note that a vending machine might also output a similar message in the event of a "misvend", or mechanical error.

If the provided subscription code is deemed valid, and if the requested item is available (i.e. is in stock and is not reserved for another subscribing customer), the vending machine control system may activate an item dispensing apparatus corresponding to the requested product to dispense the product to the customer.

During redemption transactions, vending machines may output, through output devices, a variety of other messages. For example, as shown in FIG. 5, a message reading "Thank you for using your soda card" may be communicated. Alternatively or additionally, a "savings reminder" message could be communicated to the customer, reminding the customer of the per unit savings realized through the use of the subscription promotion. For example, a message may be output, reading "You saved $0.25 on this unit by purchasing a soda card!" Further, in some embodiments, balance information (i.e. how many remaining units are available for future redemption in conjunction with a registered subscription) may be communicated to customers during the redemption transaction. However, it should be noted that, in some embodiments, balance and other subscription information may be "suppressed" (i.e. not shown) until and unless affirmatively requested by a subscribing customer (e.g. through a "balance inquiry" button of a touch screen). Such concealment would function to respect the privacy concerns of subscribing customers.

In some embodiments, it may be desirable to construct a vending machine that houses supplemental, dedicated inventory storage containers that may be exclusively used to fulfill the redemption of outstanding subscriptions. For example, certain product rows may be dedicated to fulfilling redemption requests for subscriptions.

In some embodiments, a subscription can allow a customer to acquire (additionally or alternatively) goods or services that are not available for sale from the vending machine to non-subscription customers. For example, the redemption of a subscription, or the mere possession of a subscription, can allow a customer to, e.g., use wireless services available from the vending machine. For example, the vending machine may allow Internet access by being a "hotspot" and granting the customer access. Similarly, the customer may be granted voice-over-IP services (e.g., allowing the customer to make VoIP phone calls).

Such granted services may be restricted by a number of "units" conferred upon the subscriber, such units being consumed upon, e.g., acquisition of a good, use of a service. For example, the customer, upon purchasing a subscription, may be granted a predetermined number of "minutes", which are consumed as the customer uses wireless internet access and/or makes VoIP phone calls. Such units may be purchased by subscription holders (e.g., 100 minutes for $5), or only conferred/increased upon renewing/recharging a subscription (e.g., every $5 subscription confers an additional 100 "minutes").

3.7 Update Registered Subscription Data.

In addition to updating inventory databases to reflect the redemption of subscription items (e.g., reduce the number of items of the product remaining), the vending machine control system may update registered subscription data, for example, by updating records in a subscription registration table that correspond to the customer's subscription code (e.g., reduce the number of items which may subsequently be redeemed).

If a customer has been denied the ability to redeem requested subscription items in a given redemption transaction, and has been provided with one or more additional subscription units to compensate him for his inconvenience, the customer's subscription data may be adjusted to reflect this change (e.g., by adding the additional units to the appropriate customer record in the subscription registration table).

In addition to or in lieu of updating subscription registration databases, the vending machine's payment processing apparatus may be configured to physically modify tokens provided by the subscription customer during the redemption transaction. For example, in an embodiment where subscription codes are provided on magnetic stripe cards, magnetic information stored thereon may be updated by the vending machine's card reader/writer to reflect the redemption of one or more subscription items (e.g., reduce the number of items which may be subsequently redeemed). In an embodiment in which tokens take the form of paper-based vouchers or cards, such tokens may be notched, hole-punched, printed on or otherwise physically altered to reflect the redemption of subscription items.

3.8 Renewal.

There are various methods for allowing customers to renew or modify subscriptions within the scope of the present invention. In one embodiment, customers are provided, through an output device, a reminder message indicating the number of unredeemed items remaining in the subscription, along with a subscription renewal offer. For example, a textual message provided via touch screen may read "You only have 3 Cokes® sodas left. Would you like to add 8 more to your Soda Card for $5? Just press ACCEPT and deposit $5."

Customers may also enter their subscription code, press a "recharge" button or otherwise indicate a desire to "recharge" (e.g., increase the number of units which may be redeemed with the subscription by a predetermined number, based on the inserted amount of currency), and insert the required amount of currency to "recharge" the subscription.

The terms of the offer may be based on the terms of the previous subscription, but need not be identical thereto. For example, it can be advantageous to offer a subscription with terms which increase the profitability of transactions or subscriptions.

In some renewal embodiments, the vending machine control system may dynamically construct such "renewal" offers depending on the customer's prior subscription purchase and redemption patterns. Thus, a customer who has purchased a threshold number of subscriptions in the past, and/or has consistently redeemed a threshold number of units associated with subscriptions, may be offered a subscription offer that provides for a greater subscription quantity than previously available to the customer. For example, a customer who has purchased three subscriptions to Coke® soda over the past three months and has redeemed 95% of the subscription items may be offered the ability to purchase a subscription to eight units of Coke® at a deeper per unit discount. In this manner, customers who have already indicated their willingness and ability to establish longitudinal (long lasting) relationships with a vending machine and/or a product may be provided subscription offers that are intended to increase the customer's the level of commitment.

In some embodiments, where redemption of two (or an even number of) items is required (e.g., a 2-for-$1 vending machine), then the subscription offer, when accepted, may give the customer an odd number of units remaining to be redeemed. Thus, the customer cannot completely deplete (reduce to zero) the number of units remaining on the subscription. It is more likely that the customer, having, e.g., one unit remaining, would renew or recharge his subscription.

Further, in some renewal embodiments, the vending machine and/or a remote computer may store, in a database, a financial account identifier associated with a subscription customer, allowing the customer to readily render/authorize payment through such financial account. Financial account identifiers include credit card numbers, debit card numbers, checking account numbers, or the like.

In some embodiments, customers are provided with subscription "renewal" offers that must be affirmatively accepted by customers before subscriptions are renewed and financial account identifiers are accordingly used to charge customers for the subscription price. In such embodiments, customers may be provided with such subscription extension offers either (a) at a vending machine (e.g. during a redemption transaction), or (b) through a communications network, such as over the Internet (e.g. via Web or email) or through a cellular network.

In other embodiments, customers agree to have their financial accounts automatically charged for subscription prices each time they have "depleted" a subscription through redeeming some or all paid-for units in the subscription. Thus, such "automatic renewal" may be authorized to occur automatically under certain conditions (e.g., when the number of units of products which may be redeemed per the subscription is at or below a predetermined threshold).

In such an embodiment, a customer may agree to such "automatic renewal" by, e.g., selecting one of two buttons (e.g., "auto-renewal" and "no auto-renewal") via a touch screen. In one embodiment, the customer is provided with the option to agree during each transaction in which the subscription is redeemed. The default upon registration of a subscription may be for "automatic renewal" to occur, and allow the customer to disable automatic renewal.

Many additional embodiments of the present invention are contemplated.

In one embodiment, a subscription holder may command a vending machine to dispense an item without a consequential reduction in the number of units remaining for redemption in their subscription. Such a feature is advantageous where, for example, a customer claims the vending machine did not properly dispense a paid for product (e.g., a redemption of a unit of a subscription).

Although some customers might abuse such a feature, in an embodiment where payment can be acquired automatically from the customer (e.g., by charging a known credit card account of the customer), this threat can be reduced. Specifically, whether there was actually a "misvend" (erroneous non-dispensing of an item) can be determined by determining the amount of units of the product in question that remain in the vending machine (i.e. is there one more unit than the number of recorded vends reflects?). If there is determined to be no misvend, then (1) the customer can be charged for the unit of the product reported as misvended, but believed received; (2) the customer may be preventing from renewing the subscription; (3) the customer may be preventing from redeeming any further units of the subscription (e.g., possibly receiving payment for unredeemed units).

In one embodiment, particular inventory rows or spaces within rows may be exclusively designated for "subscription only" products that are unavailable for sale to customers who do not accept subscription offers and who do not present valid subscription codes.

In one embodiment, when customers attempt to redeem a product during a redemption transaction, the vending machine control system may determine that the subscribed-to product is currently in high demand and/or short supply, and may accordingly output an offer to the customer that is intended to preserve the high demand and/or short supply inventory. For example, such customers may be offered a substitute product. In other words, customers may be provided with the option of accepting another product in lieu of the subscription item (e.g. where the customer has subscribed to a high demand product like Diet Coke® soda, the customer may be offered the ability to take another diet drink that has an equal or greater retail price). Also, where the subscribed-to product is in particularly high demand and/or short supply, the vending machine control system may output an offer to "buy the customer out" of his or her subscription, for example, by paying the customer/crediting the customer's account for an amount (e.g., an amount equal to the retail price of the remaining units in the subscription). Where the customer was initially provided a per unit discount through the subscription, such an embodiment may actually function as an opportunity for the customer to earn money by taking a financial position in vending machine inventory.

As described, in a "hard reserve" embodiment, customers may be provided the option of upgrading subscriptions so that they are guaranteed subscription items during redemption transactions. Such "hard reserve" upgrades may be purchased at a premium (for a different price) relative to other subscription offer prices.

In some embodiments, subscribers may be notified, either through the vending machine's output device(s) and/or through a communications network (e.g. via email), that service is disrupted or changed at one or more vending machines, for example, due to maintenance. The customer may indicate (e.g., to the vending machine, via a personal computer with a Web interface) which method of notification he prefers, and that method can be used to notify that customer.

In some embodiments, suggested inventory configurations for restocking purposes ("planograms"), may be designed and output based on outstanding subscriptions. Thus, in addition to or in lieu of constructing planograms based on anticipated future demand as forecasted based on previous demand for one or more products, a vending machine control system, or another computer, may retrieve information from a subscription registration database and calculate how many products are likely to be redeemed. Such a calculation may consider redemption rates for subscription promotions (e.g., only 80% of subscription items are redeemed).

In some embodiments, more than one individual may be registered in conjunction with a single subscription. Thus, "group" subscriptions may include several people. Each person in the group may be issued a code that references the group's subscription information in a registered subscription database. Individual codes may be comprised of a group component (e.g. the first four digits) and an individual component (e.g. the last six digits).

A method for establishing "longitudinal relationships" with vending machine customers includes permitting customers to accept subscription offers without payment up front, provided they input a valid credit card number. The credit card number may be used to secure (i.e. "lock" or "freeze") a portion of the customer's available credit. At the end of the subscription term, the customer may be charged the subscription price.

A method for establishing "longitudinal relationships" with vending machine customers includes the provision of discounts and benefits with no pre-payment requirement. In one embodiment, customers, identified by unique customer identifiers (e.g. a frequent shopper card), agree to have their purchases tracked. Once customers have purchased a threshold number of goods or services, the vending machine control system may authorize a discount, rebate, free product, sweepstakes entry, or the like. In another embodiment, customers may agree to receive a discount unit price for an item or items, in exchange for their agreement to purchase a certain number of products over a certain period of time. Customer financial account information may be stored, so that financial accounts may be charged in the event that customers do not perform to the agreed-to terms.

What is claimed is:

1. A vending machine configured to accept a subscription code from a customer, determine a positive number of units remaining in a subscription account identified by the subscription code, and provide access to, in response to an instance of the determining, at least one unit of a product in accordance with a term of the subscription account.

2. The vending machine of claim 1, wherein an instance of the acceptance of the subscription code from the customer, comprises:
receiving, from a mobile electronic device of the customer, a wireless transmission indicative of the subscription code.

3. The vending machine of claim 1, wherein an instance of the acceptance of the subscription code from the customer, comprises:
receiving, from a remote server device, a signal indicative of the subscription code.

4. The vending machine of claim 1, wherein an instance of the acceptance of the subscription code from the customer, comprises:
receiving, via an input device of the vending machine and from the customer, input indicative of the subscription code.

5. A machine, comprising:
a processor; and
a memory in communication with the processer, the memory storing instructions that when executed by the processor result in:
accepting a subscription code from a customer via a customer interface of the machine;
determining, based on the subscription code, a positive number of units remaining in a subscription account identified by the subscription code; and
providing, in response to an instance of the determining of the positive number of units remaining in the subscription account, at least one unit of product in accordance with a term of the subscription account.

6. The machine of claim 5, wherein an instance of the accepting of the subscription code from the customer, comprises:
receiving, from a mobile electronic device of the customer, a wireless transmission indicative of the subscription code.

7. The vending machine of claim 5, wherein an instance of the accepting of the subscription code from the customer, comprises:
receiving, from a remote server device, a signal indicative of the subscription code.

8. The vending machine of claim 5, wherein an instance of the accepting of the subscription code from the customer, comprises:
receiving, via an input device of the vending machine and from the customer, input indicative of the subscription code.

9. A non-transitory computer-readable medium storing instructions that when executed by a processing device result in:
accepting a subscription code from a customer via a customer interface of the machine;
determining, based on the subscription code, a positive number of units remaining in a subscription account identified by the subscription code; and
providing, in response to an instance of the determining of the positive number of units remaining in the subscription account, at least one unit of product in accordance with a term of the subscription account.

10. The non-transitory computer-readable medium of claim 9, wherein an instance of the accepting of the subscription code from the customer, comprises:
receiving, from a mobile electronic device of the customer, a wireless transmission indicative of the subscription code.

11. The vending machine of claim 9, wherein an instance of the accepting of the subscription code from the customer, comprises:
receiving, from a remote server device, a signal indicative of the subscription code.

12. The vending machine of claim 9, wherein an instance of the accepting of the subscription code from the customer, comprises:
receiving, via an input device of the vending machine and from the customer, input indicative of the subscription code.

* * * * *